United States Patent
Youn

(10) Patent No.: US 8,929,448 B2
(45) Date of Patent: Jan. 6, 2015

(54) INTER SUB-MODE DECISION PROCESS IN A TRANSCODING OPERATION

(75) Inventor: Jeongnam Youn, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1968 days.

(21) Appl. No.: 11/644,296

(22) Filed: Dec. 22, 2006

(65) Prior Publication Data

US 2008/0152010 A1 Jun. 26, 2008

(51) Int. Cl.
| H04N 7/32 | (2006.01) |
| H04N 19/40 | (2014.01) |
| H04N 19/103 | (2014.01) |
| H04N 19/137 | (2014.01) |
| H04N 19/176 | (2014.01) |

(52) U.S. Cl.
CPC ....... *H04N 7/26941* (2013.01); *H04N 7/26021* (2013.01); *H04N 7/26132* (2013.01); *H04N 7/26244* (2013.01)
USPC .................. 375/240.16; 375/240.17; 348/699

(58) Field of Classification Search
CPC .................................................. H04N 7/26021
USPC .................................................... 375/240.16
See application file for complete search history.

(56) References Cited

U.S. PATENT DOCUMENTS

| 6,014,181 A * | 1/2000 | Sun ............................... 348/699 |
| 6,175,593 B1 * | 1/2001 | Kim et al. ................. 375/240.17 |
| 6,553,127 B1 * | 4/2003 | Kurowski ..................... 382/100 |
| 6,842,483 B1 * | 1/2005 | Au et al. ................. 375/240.16 |
| 6,970,509 B2 * | 11/2005 | Xiang et al. ............. 375/240.16 |
| 6,987,866 B2 * | 1/2006 | Hu ................................. 382/107 |
| 7,133,447 B2 * | 11/2006 | Byun et al. ..................... 375/240 |
| 7,330,509 B2 * | 2/2008 | Lu et al. .................... 375/240.03 |
| 7,342,964 B2 * | 3/2008 | Gallant et al. ........... 375/240.16 |
| 7,349,583 B2 * | 3/2008 | Kumar et al. ................. 382/294 |
| 7,605,579 B2 * | 10/2009 | Betser et al. ............... 324/76.11 |
| 7,672,377 B2 * | 3/2010 | Heng et al. ............... 375/240.16 |
| 7,693,219 B2 * | 4/2010 | Yan .......................... 375/240.16 |
| 7,697,610 B2 * | 4/2010 | Yu et al. ................... 375/240.16 |
| 7,706,444 B1 * | 4/2010 | Conklin ................... 375/240.14 |
| 8,040,948 B2 * | 10/2011 | Filippini et al. ......... 375/240.13 |
| 8,208,548 B2 * | 6/2012 | Nagaraj et al. ........... 375/240.16 |

(Continued)

OTHER PUBLICATIONS

Chen, Gao et al.; Efficient Block Size Section of MPEG-2 to H.264 Transcoding; Proceedings of the 12th annual ACM conference in Multimedia; 2004 pp. 300-303.

(Continued)

*Primary Examiner* — William C Vaughn, Jr.
*Assistant Examiner* — Luis M Perez
(74) *Attorney, Agent, or Firm* — Trellis IP Law Group, PC

(57) ABSTRACT

In one embodiment, a macroblock is determined in an incoming bitstream. In one example, the macroblock may be a 16×16 macroblock for a first coding standard, such as MPEG-2. The macroblock is then divided into a plurality of segmented blocks. For example, an arbitrary sized segment of blocks may be used to divide the macroblock into segmented blocks. In one example, the macroblock is divided into four 8×8 segmented blocks. A plurality of statistical measures are then determined for the plurality of segmented blocks. For example, for each segmented block, a sum of absolute differences (SAD) is determined. Then, one or more sizes for the sub-blocks are determined based on the comparison. For example, a variable sub-block size for an AVC bitstream is determined.

4 Claims, 8 Drawing Sheets

(56) References Cited

U.S. PATENT DOCUMENTS

| | | | |
|---|---|---|---|
| 8,428,118 B2* | 4/2013 | Sethuraman et al. | 375/240.01 |
| 2004/0233990 A1* | 11/2004 | Sekiguchi et al. | 375/240.16 |
| 2005/0114093 A1* | 5/2005 | Cha et al. | 702/189 |
| 2005/0141614 A1* | 6/2005 | Braspenning et al. | 375/240.16 |
| 2005/0276331 A1 | 12/2005 | Lee et al. | |
| 2005/0281289 A1* | 12/2005 | Huang et al. | 370/484 |
| 2006/0008008 A1 | 1/2006 | Song | |
| 2006/0039470 A1 | 2/2006 | Kim et al. | |
| 2006/0165176 A1* | 7/2006 | Raveendran et al. | 375/240.16 |
| 2008/0002770 A1* | 1/2008 | Ugur et al. | 375/240.16 |
| 2008/0152010 A1* | 6/2008 | Youn | 375/240.16 |
| 2008/0212678 A1* | 9/2008 | Booth et al. | 375/240.16 |

OTHER PUBLICATIONS

Kim, Yangsoo, et al.; Fast Mode Decision Algorithm for H.264 Using AZCB Prediction; International Conference on Consumer Electronics 2006; 2006; pp. 33-34.

* cited by examiner

INTER SUB-MODE DECISION PROCESS IN A TRANSCODING OPERATION

BACKGROUND

Particular embodiments generally relate to transcoding, and more particularly to determining sub-block sizes in a transcoding process.

Transcoding involves the digital-to-digital conversion from one format of video sequence to another format of video sequence. For example, transcoding may be performed for a motion pictures expert group (MPEG)-2 bitstream to an advanced video coding (AVC) bitstream. Transcoding typically involves decoding/decompressing the MPEG-2 bitstream and then re-encoding it using an AVC encoder into an AVC bitstream. This is a cascaded process and involves decoding and encoding and is very complex.

In the transcoding process, motion estimation needs to be performed. Motion estimation describes a picture in terms of where each section of that picture came from in a previous picture. For example, each block is predicted from a block of equal size in a reference frame. The blocks are shifted to a position of a predicted block and the shift is represented by a motion vector.

In MPEG-2, a macroblock is a fixed size 16×16 macroblock with a motion vector. AVC, however, may use variable sized macroblocks. For example, the variable sized blocks may be 4×4, 4×8, 4×16, . . . , 16×16. Accordingly, for each variable sized block, a motion vector may be calculated. The best variable block size is then chosen. Performing the motion vector calculation for each variable sized block is very computationally expensive.

SUMMARY

Particular embodiments generally relate to determining a sub-block size for a macroblock in a transcoding process for an incoming bitstream. In one embodiment, a macroblock is determined in an incoming bitstream. In one example, the macroblock may be a 16×16 macroblock for a first coding standard, such as MPEG-2. The macroblock is then divided into a plurality of segmented blocks. For example, an arbitrary sized segment of blocks may be used to divide the macroblock into segmented blocks. In one example, the macroblock is divided into four 8×8 segmented blocks.

A plurality of statistical measures are then determined for the plurality of segmented blocks. For example, for each segmented block, a sum of absolute differences (SAD) is determined. Then, one or more sizes for the sub-blocks are determined based on the comparison. For example, a variable sub-block size for an AVC bitstream is determined.

In one example, the statistical measure for a first segmented block may be compared to the statistical measure for a second segmented block. Based on this comparison, it is determined whether these two blocks should be combined to form a variable sized sub-block. Further comparisons are then performed between the third and fourth segmented blocks, the first and third segmented blocks, and/or the second and fourth segmented blocks. Based on these comparisons, a variable sub-block size is determined. For example, it may be determined that two 8×16 variable sized sub-blocks should be used for the 16×16 macroblock. After determining the variable sub-block size, motion vectors are determined. Thus, motion vectors are only determined for the two 8×16 sub-blocks. Accordingly, motion vectors do not have to be determined for each variable sub-block size possible.

A further understanding of the nature and the advantages of particular embodiments disclosed herein may be realized by reference of the remaining portions of the specification and the attached drawings.

DETAILED DESCRIPTION OF EMBODIMENTS OF THE INVENTION

Figure 1:
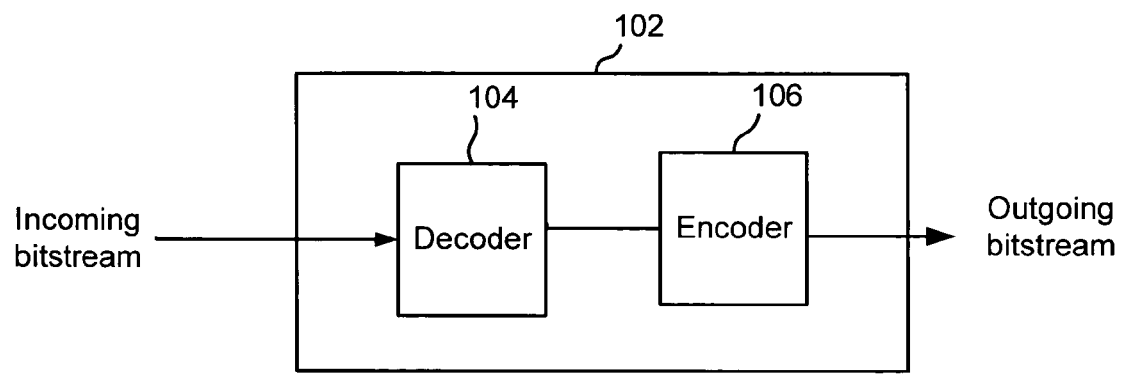
FIG. 1 depicts a simplified system according to one embodiment.

FIG. 1 depicts a simplified system 100 according to one embodiment. As shown, a transcoder 102 includes a decoder 104 and an encoder 106. An incoming bitstream is received at transcoder 102, which can transcode the bitstream into an outgoing bitstream. In one embodiment, an incoming bitstream is transcoded from a first digital format to a second digital format. For example, an MPEG-2 bitstream is transcoded into an AVC bitstream.

Decoder 104 is configured to decode the incoming bitstream. This may involve decompressing the bitstream into an intermediate format. In one embodiment, a compressed MPEG-2 bitstream is decoded/uncompressed.

Encoder 106 is then configured to encode the decoded bitstream. In one embodiment, encoder 106 encodes the bitstream into an AVC bitstream. Although MPEG-2 and AVC are discussed, it will be understood that other coding standards will be appreciated. Also, it will be understood that further advances in MPEG-2 and AVC will also be appreciated. For discussion purposes, MPEG-2 and AVC are used as examples, but it will be understood that embodiments of the present invention may be used with other coding standards.

In MPEG-2, the incoming bitstream may be encoded in macroblocks. These macroblocks may be of a fixed size, such as 16×16 pixels. AVC, however, may use variable sized macroblocks that may be smaller than the MPEG-2 macroblock. For example, different sizes may include 4×4, 4×8, 4×16, 8×8, . . . , 16×16. Because of this, the size of the sub-block used in AVC needs to be determined. Conventionally, motion estimation for each of the possible variable sized sub-blocks is determined. Then, the variable sized sub-block that is considered to have the best motion estimation is chosen. However, motion vectors need to be determined for all the variable sized blocks. In the encoding process, searching for the best sub-blocks is one of the most computationally expensive functions. The prediction mode of determining smaller blocks may be referred as sub-mode. In one embodiment, the process is performed using information in the incoming bitstream to provide an acceptable sub-mode.

Embodiments of the present invention determine the best sub-block size using information in the MPEG-2 bitstream. For example, instead of checking the motion estimation for every possible variable sized sub-block, the complexity is reduced using a comparison of statistical measures. Based on this comparison, the variable block size is determined.

Figure 2:
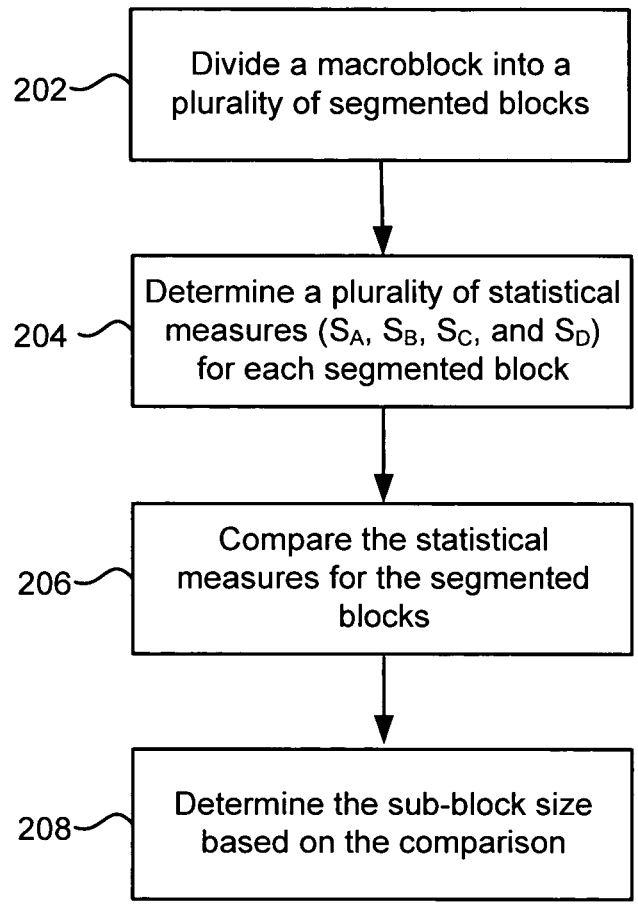
FIG. 2 depicts a simplified flowchart of a method for determining sub-block sizes according to one embodiment of the present invention.
Figure 3:
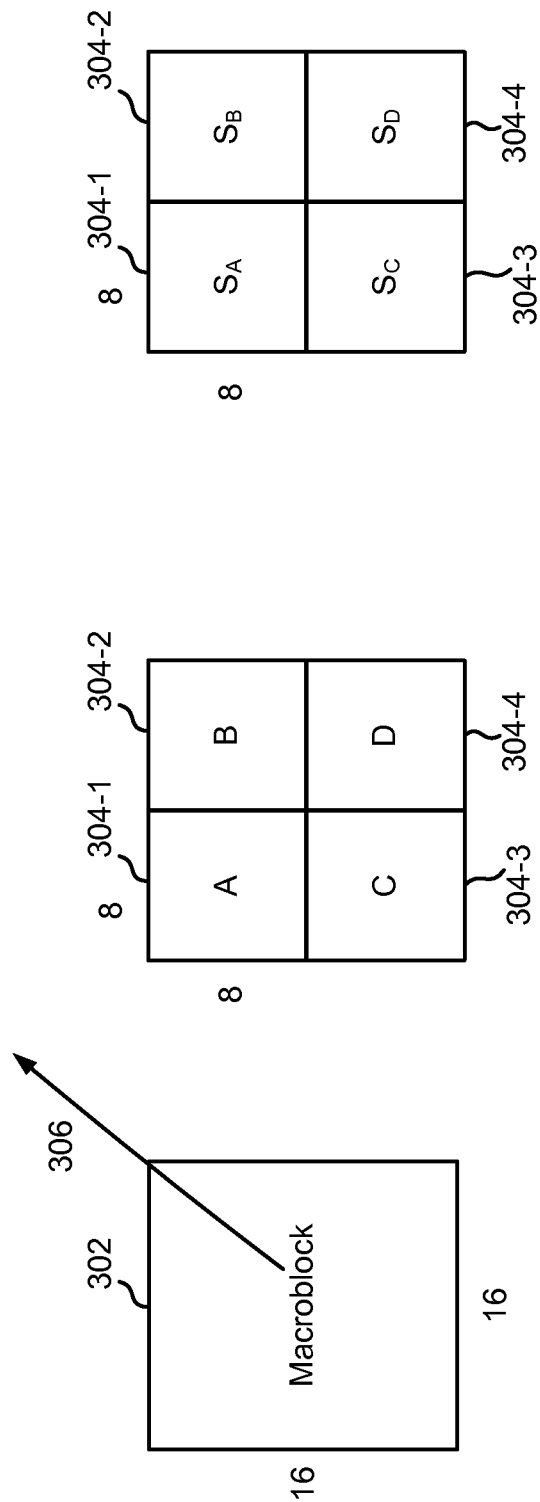
FIG. 3 shows a macroblock that is of a 16×16 size.

FIG. 2 depicts a simplified flowchart of a method for determining sub-block sizes according to one embodiment of the present invention. Step 202 divides a macroblock into a plurality of segmented blocks. For example, an arbitrary variable sub-block size may be chosen to divide the macroblock into. FIG. 3 shows a macroblock 302 that is of a 16×16 size. Macroblock 302 is then divided into a plurality of segmented blocks 304. Each segmented block is 8×8. However, it will be understood that other sizes of segmented blocks may be provided. For example, segmented blocks may be 4×4, 4×8, 16×16, or any other size. As shown, segmented blocks are labeled A, B, C, and D.

Step 204 then determines a plurality of statistical measures ($S_A$, $S_B$, $S_C$, and $S_D$) for each segmented block 304. For example, information in the incoming bitstream is used to determine the statistical measure. In one example, a motion vector 306 for macroblock 302 is used to compute the SAD for each segmented block 304. The SAD may be calculated by looking at the previous frame pointed to by the motion vector. The segmented block is subtracted from an 8×8 block of the previous frame and then added to compute the SAD of each 8×8 block. Although an SAD is described, it will be understood that other statistical measures may be used. For example, mean square error, or any other statistical distribution may be used.

Step 206 then compares the statistical measures for the segmented blocks 304. For example, the statistical measure may be compared between segmented block 304-1 and segmented block 304-2. Also, the statistical measure may be compared between segmented blocks 304-3 and 304-4, blocks 304-1 and 304-2, and blocks 304-2 and 304-4. It will be understood that other comparisons may also be appreciated. Further, other combinations as different sized segmented blocks 304 may also be appreciated. For example, if eight 4×4 blocks are provided, further comparisons may be necessary.

If the statistical measures are similar, it may be expected that the segmented blocks 304 have similar characteristics. In this case, the motion vector may be pointing to the same object for both segmented blocks 304. Thus, using the same motion vector for a prediction for both of the segmented blocks may be efficient. In one example, if the macroblock is part of a person's face, and the person's face is not moving, then the SAD may be zero because the motion vector points to the same position of a previous frame. If both the SADs are the same, it may be assumed that the motion vector for both segmented blocks 304 may be similar. Thus, the two segmented blocks may be combined into one. However, if the statistical measures are vastly different, it may be that the person has moved and thus the information in the segmented blocks 304 may be different. Thus, the prediction for the segmented blocks 304 may be better with different motion vectors. Segmented blocks 304 may not be combined in this case.

In one embodiment, a threshold may be used to determine whether or not to combine segmented blocks. A comparison shown below may be used to determine whether or not to combine segmented blocks 304.

If ($|SAD(B)-SAD(A)|$<Threshold_1) Combine the blocks A and B to form 16×8 or 16×16;

If ($|SAD(D)-SAD(C)|$<Threshold_1) Combine the blocks C and D to form 16×8 or 16×16;

If ($|SAD(A)-SAD(C)|$<Threshold_1) Combine the blocks A and C to form 8×16 or 16×16;

If ($|SAD(B)-SAD(D)|$<Threshold_1) Combine the blocks A and C to form 8×16 or 16×16

The threshold may be determined by any method. For example, theoretical threshold values may be determined based on previous experimentation in which blocks were combined and not combined and the performance thereafter.

Figure 4:
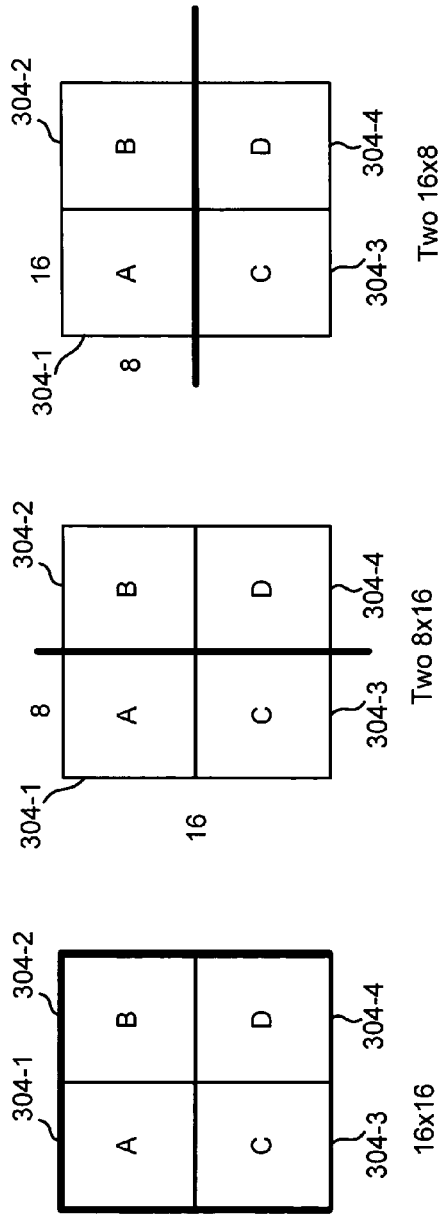
FIG. 4 shows different combinations of blocks that may be possible.
Figure 4:
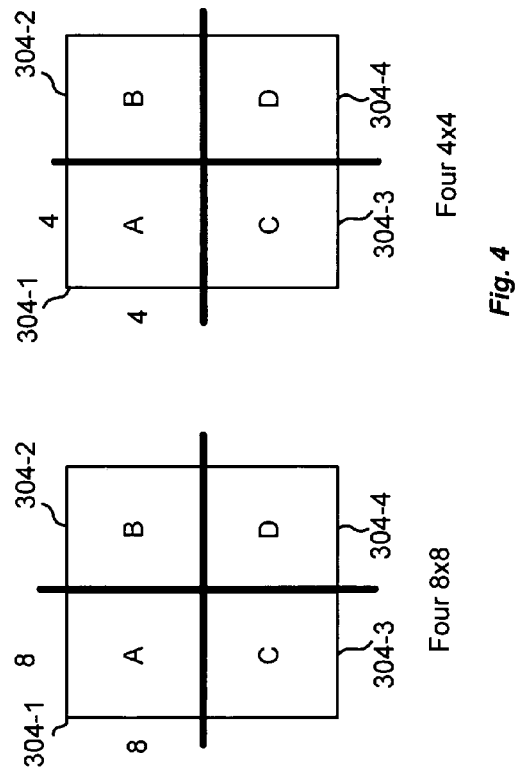

Step 208 then determines the sub-block size based on the comparison. Based on the comparison, it may be determined whether or not certain blocks should be combined or not. FIG. 4 shows different combinations of blocks that may be possible. As shown, a 16×16, two 8×16 sub-blocks, two 16×8 sub-blocks, four 8×8 sub-blocks, and four 4×4 sub-blocks in one 8×8 block may be determined. As shown, the sub-blocks may be different depending on the comparison. For example, with the two 8×16 blocks, in that comparison, it was determined that segmented block 304-1 and segmented 304-2 should be combined. In addition, it was determined that segmented blocks 304-2 and 304-4 should be combined. Thus, two 8×16 blocks were determined.

Although one comparison is described, it will be understood that the above method may also be extended to determine additional blocks. For example, smaller blocks may be determined after the first sub-block size is determined. The method may categorize the sub-blocks into smaller 4×4 blocks. For example, in the case of the four 8×8 blocks, the above process may be used to cluster 4×4 blocks of each 8×8 block into an 8×8 block, 8×4 blocks, 4×8 blocks, and 4×4 blocks.

Figure 5:
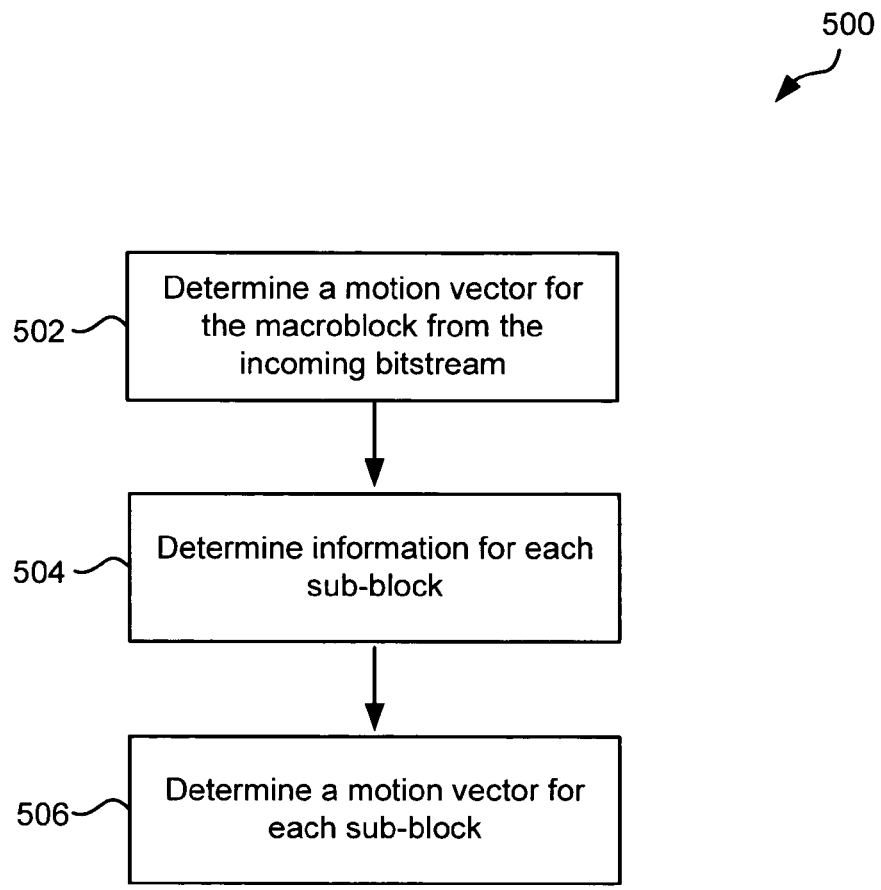
FIG. 5 depicts a simplified flow chart of a method for determining a motion vector for a sub-block according to one embodiment.

After determining the sub-block size, the motion vector for each sub-block still has not been determined. In this case, the motion vector may be determined for each block. FIG. 5 depicts a simplified flow chart 500 of a method for determining a motion vector for a sub-block according to one embodiment. Step 502 determines a motion vector for the macroblock from the incoming bitstream. This motion vector is for the 16×16 macroblock.

Step 504 then determines information for each sub-block. For example, the information for each sub-block may be the SAD determined above.

Figure 6:
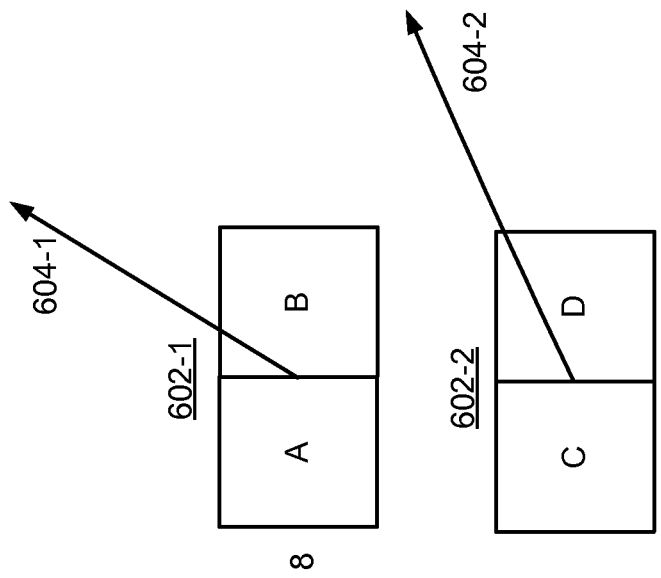
FIG. 6 shows a motion vector for a macroblock.
Figure 6:
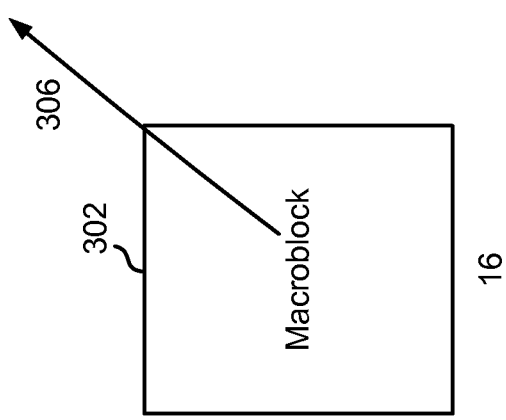

Step 506 then determines a motion vector for each sub-block. Since the size of subblock is determined, the motion estimation can use this information. In other words, the motion estimation only searches motion vectors related to the current block size. Without considering the current block size, the complexity of motion estimation may be very expensive because it has to search all the possible motion vectors for every different block size. Thus, by determining the block size, determining the motion estimation for all of the possible variable block sizes is avoided. For example, the motion vector for the 16×16 macroblock 302 may be split into multiple motion vectors if multiple sub-blocks are determined. In one example, FIG. 6 shows a motion vector for a macroblock 302. As shown, two sub-blocks 602-1 and 602-2 are provided. Motion vector 306 is divided into a first motion vector 604-1 and a second motion vector 604-2. Motion vectors 604-1 and 604-2 are determined based on a better prediction of sub-block 602-1 and 602-2.

Figure 7:
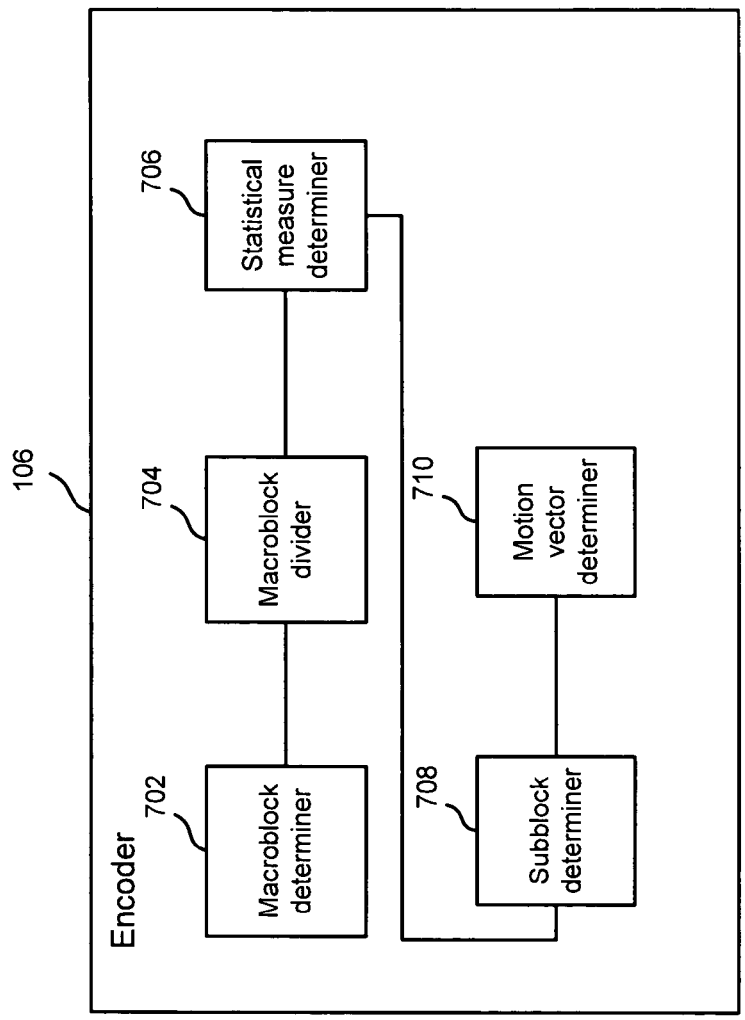
FIG. 7 depicts a more detailed embodiment of an encoder according to one embodiment of the present invention.

FIG. 7 depicts a more detailed embodiment of encoder 106 according to one embodiment of the present invention. As shown, coder 106 includes a macroblock determiner 702, a macroblock divider 704, a statistical measure determiner 706, a sub-block determiner 708, and a motion vector determiner 710.

Macroblock determiner 702 is configured to determine a macroblock from an incoming bitstream. Macroblock divider 704 then determines segment blocks from the macroblock. For example, four 8×8 segment blocks 304 may be determined.

Statistical measure determiner 706 then determines a statistical measure for each segment of the block. Sub-block determiner 708 then determines the sub-block size for the macroblock. For example, depending on a comparison of the statistical measures, the sub-block size is determined. Motion vector determiner 710 then determines a motion vector for each of the sub-blocks determined. For example, the motion vector for the original macroblock may be used to determine the motion vector for each of the sub-blocks.

Figure 8:
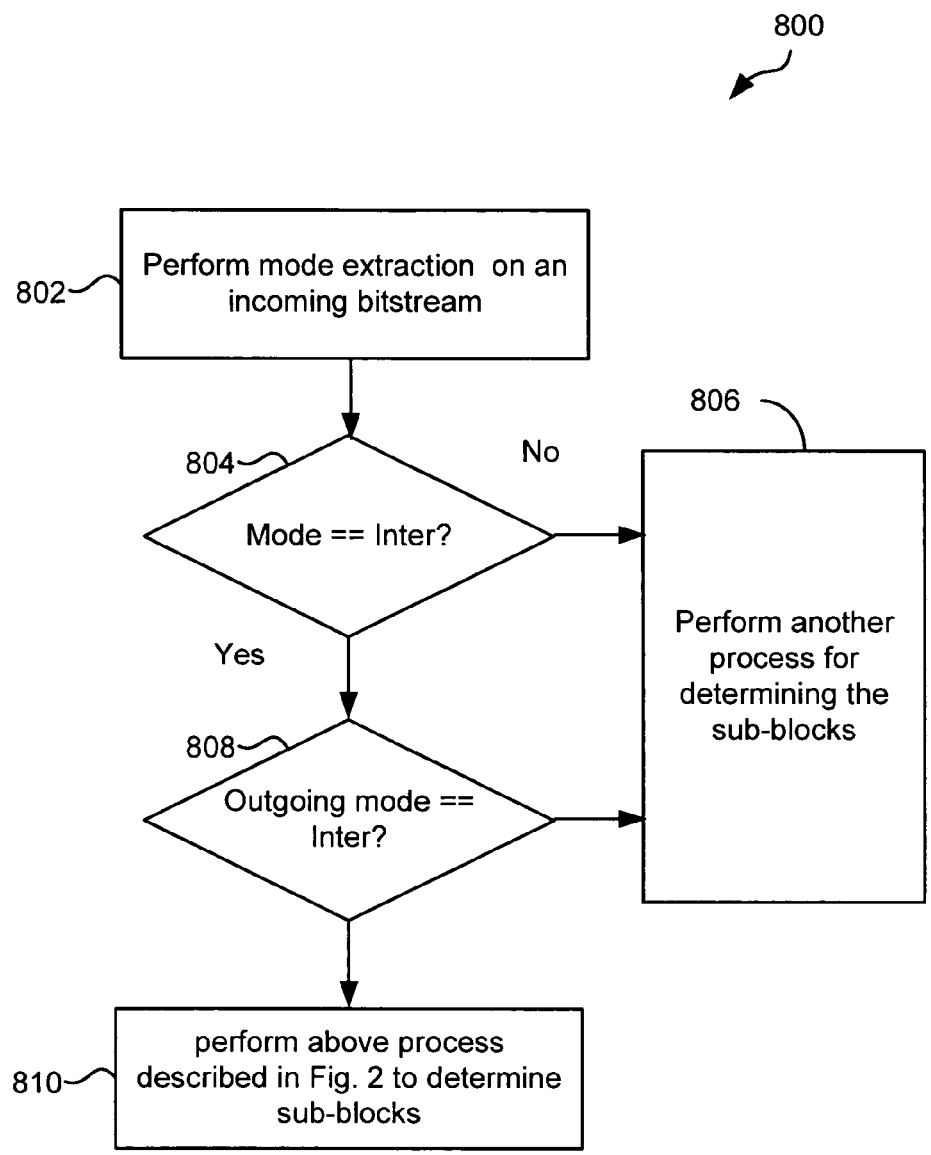
FIG. 8 depicts a simplified flow chart for determining if the above process should be performed according to one embodiment.

A macroblock in MPEG-2 may be encoded as intra- or inter-depending on the content information of the video sequences. The above method may only be applied when the encoding method is inter-mode. If the coding mode is intra-, then another process may be applied to determine sub-blocks. FIG. 8 depicts a simplified flow chart for determining if the above process should be performed according to one embodiment. In step 802, mode extraction is performed on an incoming bitstream. For example, the mode is determined based on information in the bitstream.

Step 804 then determines if the mode is inter. If the mode is not inter, then step 806 performs another process for determining the sub-blocks.

If the mode is inter, then the outgoing mode is determined in step 808. For example, if the outgoing bitstream is not going to be encoded in inter in step 806, another process is used to perform the encoding.

If the outgoing mode is going to be inter, and thus both the incoming and outgoing modes are inter, step 810 performs the above described process to determine sub-blocks.

Accordingly, embodiments of the present invention provide many advantages. For example, computation complexity is reduced. Because the process used reduces the number of calculations that need to be performed, the sub-mode may be determined using less computational power. Further, the complexity of the calculations is reduced. Also, information in the incoming bitstream is used to determine the sub-mode and thus is efficient.

Although the description has been described with respect to particular embodiments thereof, these particular embodiments are merely illustrative, and not restrictive. For example, other coding standards may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

I claim:

1. A method for determining one or more sub-block sizes for a macroblock in a transcoding process for an incoming bitstream, the method comprising:
    determining a macroblock in the incoming bitstream;
    dividing the macroblock into a plurality of segmented blocks, each segmented block being characterized by a first size including a plurality of pixels;
    determining for each of the plurality of segmented blocks, a statistical measure comprising a sum of absolute difference (SAD), computed for each of the plurality of segmented blocks using a motion vector for the macroblock;
    comparing the statistical measures for a first one and a second one of the plurality of segmented blocks within the macroblock; and
    if the difference between the statistical measures for the first one and the second one of the plurality of segmented blocks is lower than a predetermined threshold, combining the first and second segmented blocks, and selecting the size of the combination as a sub-block size for the transcoding process for the first and second segmented blocks;
    but if the difference between the statistical measures for the first one and the second one of the plurality is not lower than the predetermined threshold, comparing the statistical measures for the first one and a third one of the plurality of segmented blocks within the macroblock; and
    if the difference between the statistical measures for the first one and the third one of the plurality of segmented blocks is lower than the predetermined threshold, combining the first and third segmented blocks, and selecting the size of the combination as a sub-block size for the transcoding process for the first and third segmented blocks;
    but if the difference between the statistical measures for the first one and the third one of the plurality is not lower than the predetermined threshold, selecting the first size as a sub-block size for the transcoding process for the first segmented block.

2. The method of claim 1, further comprising generating a motion vector for each of the sub-blocks determined after sub-block sizes have been selected for all of the plurality of segmented blocks within the macroblock.

3. An apparatus configured to determining one or more sub-block sizes for a macroblock in a transcoding process for an incoming bitstream, the apparatus comprising:
    one or more processors; and
    logic encoded in one or more tangible media for execution by the one or more processors and when executed operable to:
    determine a macroblock in the incoming bitstream;
    divide the macroblock into a plurality of segmented blocks, each segmented block being characterized by a first size including a plurality of pixels
    determine for each of the plurality of segmented blocks, a statistical measure comprising a sum of absolute difference (SAD), computed for each of the plurality of segmented blocks using a motion vector for the macroblock;
    compare the statistical measures for a first one and a second one of the plurality of segmented blocks within the macroblock; and
    if the difference between the statistical measures for the first one and the second one of the plurality of segmented blocks is lower than a predetermined threshold, combine the first and second segmented blocks, and select the size of the combination as a sub-block size for the transcoding process for the first and second segmented blocks;
    but if the difference between the statistical measures for the first one and the second one of the plurality is not lower than the predetermined threshold, compare the statistical measures for the first one and a third one of the plurality of segmented blocks within the macroblock; and
    if the difference between the statistical measures for the first one and the third one of the plurality of segmented blocks is lower than the predetermined threshold, combine the first and third segmented blocks, and select the size of the combination as a sub-block size for the transcoding process for the first and third segmented blocks;
    but if the difference between the statistical measures for the first one and the third one of the plurality is not lower than the predetermined threshold, select the first size as a sub-block size for the transcoding process for the first segmented block.

4. The apparatus of claim 3, wherein the logic when executed is further operable to generate a motion vector for each of the sub-blocks determined after sub-block sizes have been selected for all of the plurality of segmented blocks within the macroblock.

\* \* \* \* \*